Patented May 11, 1965

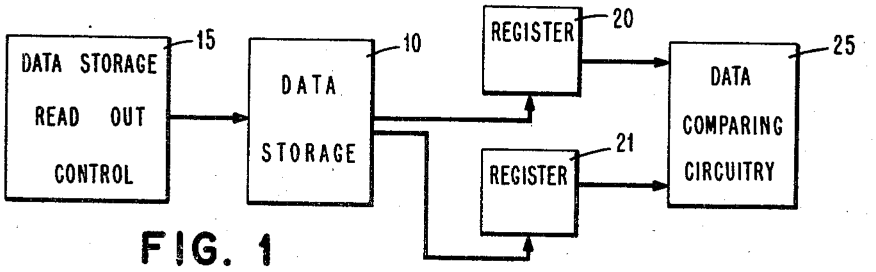
FIG. 1
| | G1 | G2 | 12 | 11 | 0 | A | B | C | D | E |
|---|---|---|---|---|---|---|---|---|---|---|
| BLANK | G | G | | | | | | | | |
| 12 | | G | 1 | | | | | | | |
| 11 | | G | | 1 | | | | | | |
| 0-1 | | G | | | 1 | 1 | 1 | | | |
| A | | | 1 | | | 1 | 1 | | | |
| B | | | 1 | | | 1 | | 1 | | |
| C | | | 1 | | | 1 | | | 1 | |
| D | | | 1 | | | 1 | | | | 1 |
| E | | | 1 | | | | 1 | 1 | | |
| F | | | 1 | | | | 1 | | 1 | |
| G | | | 1 | | | | 1 | | | 1 |
| H | | | 1 | | | | | 1 | 1 | |
| I | | | 1 | | | | | 1 | | 1 |
| J | | | | 1 | | 1 | 1 | | | |
| K | | | | 1 | | 1 | | 1 | | |
| L | | | | 1 | | 1 | | | 1 | |
| M | | | | 1 | | 1 | | | | 1 |
| N | | | | 1 | | | 1 | 1 | | |
| O | | | | 1 | | | 1 | | 1 | |
| P | | | | 1 | | | 1 | | | 1 |
| Q | | | | 1 | | | | 1 | 1 | |
| R | | | | 1 | | | | 1 | | 1 |
| S | | | | | 1 | 1 | | 1 | | |
| T | | | | | 1 | 1 | | | 1 | |
| U | | | | | 1 | 1 | | | | 1 |
| V | | | | | 1 | | 1 | 1 | | |
| W | | | | | 1 | | 1 | | 1 | |
| X | | | | | 1 | | 1 | | | 1 |
| Y | | | | | 1 | | | 1 | 1 | |
| Z | | | | | 1 | | | 1 | | 1 |
| 0 | | | | | 1 | | | | | |
| 1 | | | | | | 1 | 1 | | | |
| 2 | | | | | | 1 | | 1 | | |
| 3 | | | | | | 1 | | | 1 | |
| 4 | | | | | | 1 | | | | 1 |
| 5 | | | | | | | 1 | 1 | | |
| 6 | | | | | | | 1 | | 1 | |
| 7 | | | | | | | 1 | | | 1 |
| 8 | | | | | | | | 1 | 1 | |
| 9 | | | | | | | | 1 | | 1 |
FIG. 2
FIG. 3
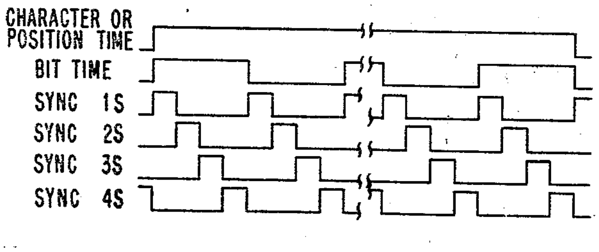
INVENTORS
RICHARD A. CHRISTIANSEN
NORMAN S. STOCKDALE
HARRY J. TASHJIAN
BY Donald F. Voss
ATTORNEY United States Patent Office 3,183,484

3,183,484

SERIAL BY BIT, SERIAL BY CHARACTER, DATA COMPARING APPARATUS

Richard A. Christiansen, Rochester, Minn., Norman S. Stockdale, Endwell, N.Y., and Harry J. Tashjian, Rochester, Minn., assignors to International Business Machines Corporation, New York, N.Y., a corporation of New York Filed Nov. 13, 1961, Ser. No. 151,860

8 Claims. (Cl. 340—146.2)

This invention relates to data processing apparatus and, more particularly, to apparatus for sequentially examining pairs of bits of data forming characters to determine whether or not the characters being examined on a bit-by-bit basis are equal and, if not equal, which character is considered to be high according to a particular predetermined collating sequence assigned to the characters.

This invention finds utility in data processing apparatus requiring a comparison of data characters whereby the results of the comparisons control further processing of the data or the distribution of the records from which the data was derived, such as in a machine termed "a collator."

The present invention has the ability to process both alphabetic and numeric data where the alphabetic data includes special characters. Each character, whether alphabetic or numeric, is represented by several bits of data. Comparison takes place on a column-by-column basis within a field of data and by bit-by-bit basis within a column. Hence, for each character, there will be a sequence of comparisons which correspond to the number of bit positions which are available to represent characters. The result of each comparison between any two characters will indicate either that the characters compare equally or that one compares high with respect to the other. If a pair of characters compare equal, then the comparison operation proceeds to the next two pairs of characters. If the results of comparison indicate that the characters are unequal, the comparison operation stops and an indication is provided as to the relative weights of the characters; i.e., which compares high with respect to the other.

Accordingly, a prime object of the invention is to provide improved apparatus which enables the comparison of pairs of data characters on a serial-by-bit and a serial-by-character basis.

Another very important object of the invention is to provide apparatus for sequentially examining pairs of bits of data forming characters to determine whether or not the characters being examined are equal and, if not equal, which characters are considered to be high or low according to a particular predetermined collating sequence assigned to the characters.

Still another very important object of the invention is to provide apparatus for sequentially comparing pairs of bits of data forming characters to determine whether or not the characters being examined are equal and, if the characters do compare equal, the comparison automatically continues to compare a second pair of characters.

A more specific object of the invention is to provide data comparing apparatus that is relatively low in cost.

The foregoing and other objects, features and advantages of the invention will be apparent from the following more particular description of a preferred embodiment of the invention, as illustrated in the accompanying drawings.

In the drawings:

FIG. 1 is a view diagrammatically illustrating the invention in block form;

FIG. 2 is a diagram illustrating the collatable code;

Figure 4:
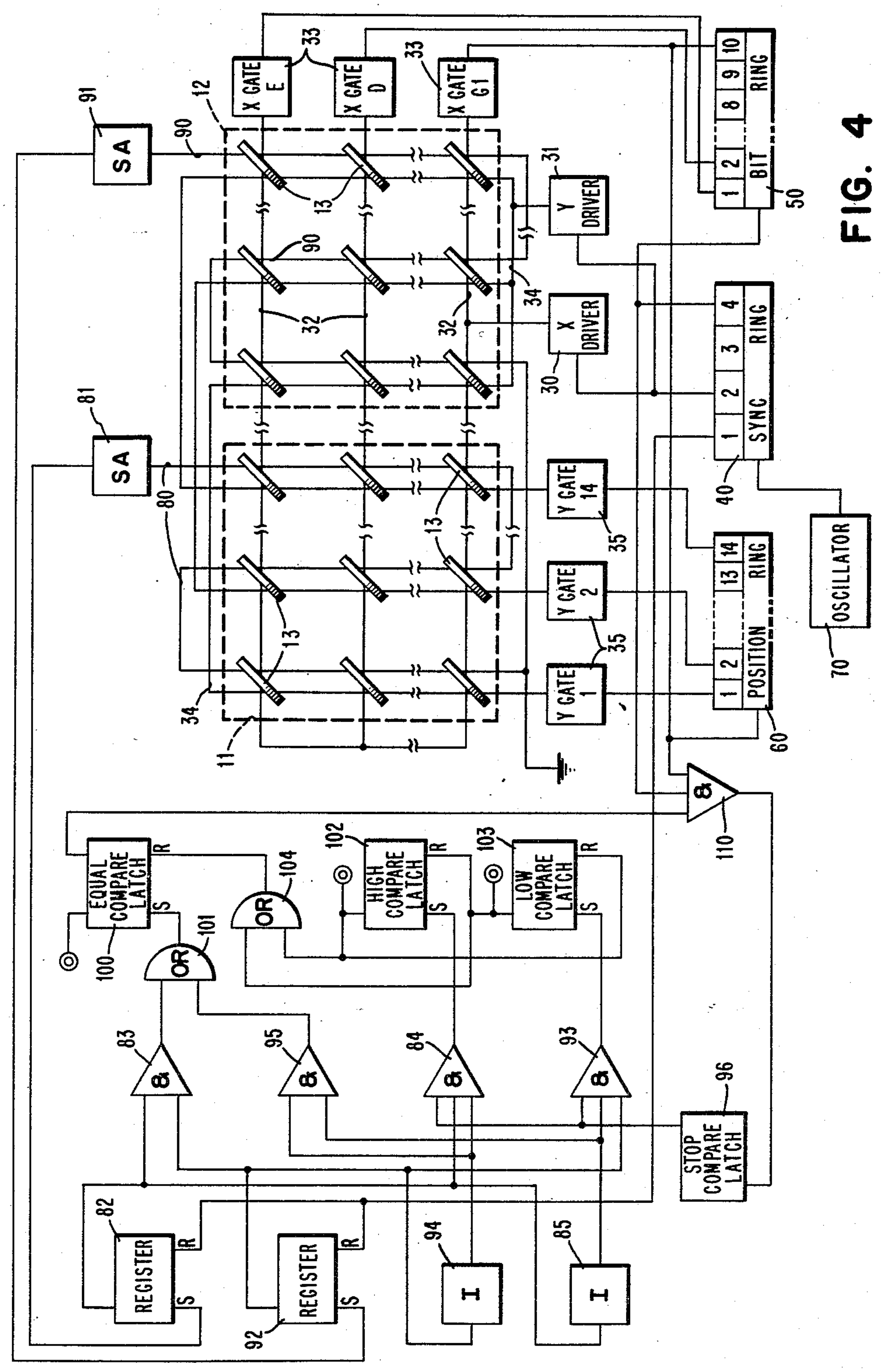
Figure 5:
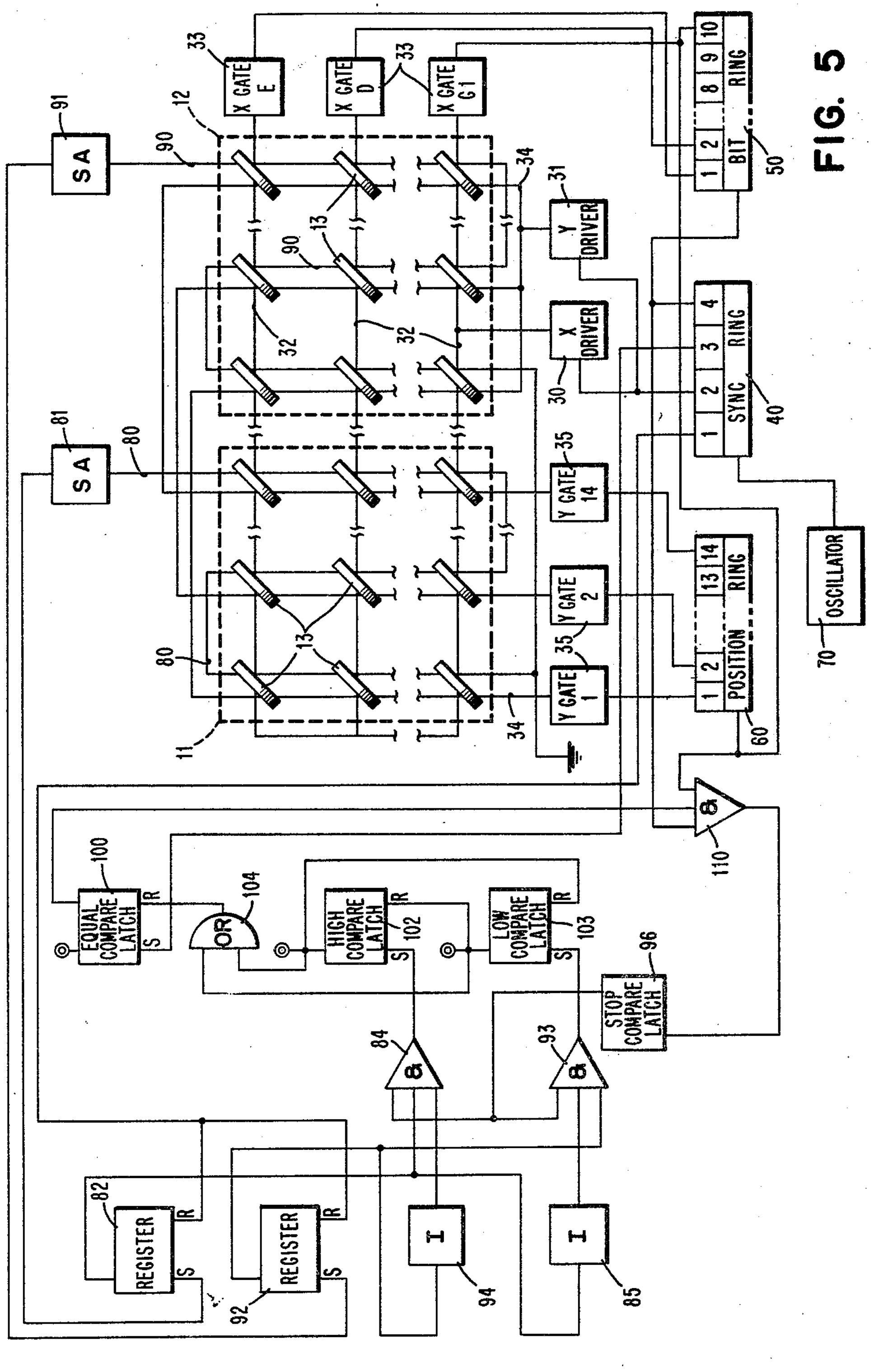

FIG. 3 schematically illustrates the timing impulses involved in the readout of data from data storage and in the data comparing operation;

FIG. 4 is a detailed schematic circuit diagram of data storage, the data storage readout controls and the data comparing circuitry; and, FIG. 5 is a schematic circuit diagram of an alternate embodiment for the data comparing circuitry.

The invention to be described hereinafter is also shown and described but not claimed in a copending application, Serial No. 137,418, in the name of H. J. Tashjian for Data Processing Apparatus, filed September 11, 1961, and assigned to the same assignee of the present application.

With reference to the drawings and particularly to FIG. 1, the invention is illustrated by way of example as data storage apparatus 10 for storing data characters represented by bits of data according to a predetermined collatable code represented in FIG. 2. Pairs of bits of data forming a pair of characters are read out serially from data storage 10 under control of data storage readout control apparatus 15 to registers 20 and 21, respectively. The outputs of registers 20 and 21 are connected to data comparing circuitry 25.

In this particular example, data storage 10 includes a first data storage area 11 from which data is read out to register 20 and a second data storage area 12 from which data is read out to register 21. The elements for storing bits of data, in this example, are magnetic cores 13, FIG. 4, arranged in columns and rows where each column of cores represents a character and each row position within a particular column represents a bit position of the character according to the collatable code represented in FIG. 2. In this example, there are fourteen columns in the data storage areas 11 and 12 with ten bit positions or rows within each column to represent the bits E, D, C, B, A, 0, 11, 12, G2 and G1.

With reference to FIG. 2, it is seen that a combination of two bits in the bit positions E through A is utilized to represent numeric characters 1 to 9. A single bit and, in this particular instance, a bit in the zero bit position is utilized to represent a numeric zero. A combination of two bits in the bit positions E through A and one bit in the bit positions 0, 11 and 12 is utilized to represent the alphabetic characters A through Z. A combination of two bits in the bit positions E through A and one bit in the bit positions 0, 11 and 12 and one bit in the bit position G2 is utilized to represent a character designated 0/1. Combinations of one bit in the bit positions 0, 11 and 12 and a bit in the bit position G2 are utilized to represent the characters 11 and 12. The combination of bits in the bit positions G1 and G2 is utilized to represent a blank.

The use of magnetic cores to store bits of data is so well known that a description of the phenomena involved will not be given. However, the operation of the magnetic core matrix forming the data storage areas 11 and 12 is based upon the well-known principle of utilizing half-select currents for reading and writing and the use of a sense winding to detect the state of the cores as the same are read. Cores containing a bit of data are arbitrarily designated as being in the "one" state and those which do not contain a bit of data are designated as being in the "zero" state. When reading a magnetic core, as it will be seen shortly, two core drivers, each supplying approximately half of the current necessary to switch the state of the core, furnish the current in such a direction such that it tends to set the core in the "zero" state. Hence, if a core had been in the "zero" state prior to being read, then, when the core is read, there will be no change in state and there will be no output of the sense winding which threads the core. If the core had been in the "one" state, it is switched to the "zero" state upon being read; and an output signal will be present on the sense winding. In this example, see FIG. 4, drivers 30 and 31 furnish the necessary current for reading the cores sequentially by bit and sequentially by character for positions 1 to 14, inclusive.

The driver 30 is connected to windings 32 which thread the magnetic cores 13 of storage areas 11 and 12 by rows. The winding 32 for each row is connected to a corresponding gate 33 which, when rendered operable, permits current to flow through the particular winding for the particular row. There is a gate for each row and, as it will be recalled, there is a row for each bit position of the collatable code. The driver 31 is connected to windings which thread the magnetic cores 13 according to columns. The winding 34 for each column is connected to the gate 35 which, when rendered operable, permits current to flow through the winding 34. Since, in this example, it is desired to read bits of data concurrently from storage areas 11 and 22, the column windings 34 threading the magnetic cores 13 in the storage area 11 also thread a corresponding column of cores 13 in the storage area 12 and there is a single gate for each column winding 34 which threads one column in storage area 11 and a corresponding column in storage area 12.

Energization of the drivers 30 and 31 to effect the readout of data from the cores is under control of a sync ring 40 which is a 4-position synchronizing ring furnishing four discrete sequentially occurring electrical impulses, each impulse having a duration of approximately eight microseconds. The outputs from the sync ring 40 are designated 1S, 2S, 3S and 4S and are shown in FIG. 3. The output from the last or fourth position of the sync ring 40 is connected to the input of a 10-position bit ring 50 which has ten outputs for emitting ten discrete sequentially occurring electrical impulses, each impulse having a duration equivalent to the time duration of four sync pulses or 32 microseconds. Hence, for every bit impulse, there are four sync impulses. The output of the last or tenth position of the bit ring 50 is connected to the input of a position or column ring 60 having fourteen outputs for providing fourteen discrete sequentially occurring electrical impulses, each having a time duration equal to that of ten electrical impulses from the bit ring or equalling 320 microseconds.

In this particular example, the output from the second position of the sync ring 40 is connected to the inputs of drivers 30 and 31 so as to energize the same for every sync 2 time. While the drivers 30 and 31 are energized every sync 2 time, current will be permitted to flow over the conductors 32 only when the gates 33 are rendered active. The gates 33 are activated under control of the bit ring 50, each gate 33 being connected to the output of a corresponding position of the bit ring. As seen in FIG. 4, gate E is connected to the output of the first position of the bit ring 50 while gate G1 is connected to the output of the tenth position of the bit ring. Additionally, it is seen that the gates 35 are connected to outputs of the position ring 60. Hence, only those cores in the column for which its corresponding gate is activated will be selected during the period that data is read from data storage. By this arrangement, data is read from data storage serially by bit under control of the bit ring 50 and serially by character under control of the position ring 60 simultaneously from both data storage areas 11 and 12. The electrical impulses for activating the sync ring 40 come from an oscillator 70 which has its output connected to the input of the sync ring 40.

A sense winding 80 threads each core in the storage area 11 and is connected between ground potential and the input of a sense amplifier 81. Since only one core of storage area 11 may be interrogated at any one time, it is possible to have the sense winding 80 thread each core in storage area 11. Similarly, a sense winding 90 threads each core of data storage area 12 and is connected between ground potential and a sense amplifier 91.

The outputs of sense amplifiers 81 and 91 are connected to inputs of single bit registers 82 and 92, respectively. The registers 82 and 92 essentially are bistable devices of the type well known in the art. The reset terminals of the registers 82 and 92 are connected to the output of the first position of the sync ring 40. Hence, the registers 82 and 92 are reset every sync 1 time. The outputs of the registers 82 and 92 are taken from the set side thereof. The output of the register 82 is connected to an input of a logical AND circuit 83, to the input of a logical AND circuit 84, and to the input of an inverter 85. Logical AND circuits 83 and 84 and the inverter 85 are of the type well known in the art and do not require further explanation. The output of register 92 is connected to an input of logical AND circuit 83, to an input of a logical AND circuit 93, and to the input of an inverter 94. The outputs of inverters 85 and 94 are connected to inputs of a logical AND circuit 95. The output of an inverter 85 is also connected as an input to logical AND circuit 93 while the output of inverter 94 is connected to an input of logical AND circuit 84. Logical AND circuits 84 and 93 each have another input connected to the output of a stop compare latch 96, which is associated with the reset side thereof. The function of the stop compare latch 96 will be described shortly.

Generally speaking, logical AND circuits 83 and 95 control the setting of an equal compare latch 100. This is accomplished by means of a logical OR circuit 101 which has its inputs connected to the outputs of logical AND circuits 83 and 95. The output of the logical OR circuit 101 is connected to the set terminal of the equal compare latch 100. The resetting of the equal compare latch 100 will be described shortly.

Logical AND circuit 84 controls the setting of a high compare latch 102 which has its set terminal connected to the output of the logical AND circuit 84. Similarly, logical AND circuit 93 controls the setting of a low compare latch 103 which has its set terminal connected to the output of the logical AND circuit 93.

The outputs of the high compare latch 102 and the low compare latch 103 associated with the set side thereof are connected to control the resetting of the equal compare latch 100 and the resetting of each other. Accordingly, the output of the high compare latch 102 is connected to an input of a logical OR circuit 104 which has its output connected to the reset terminal of the equal compare latch 100. The output of the high compare latch 102 is also connected to the reset terminal of the low compare latch 103. By this arrangement, whenever the high compare latch 102 is set, the equal compare latch 100 and the low compare latch 103 will be reset. The output of the low compare latch 103 associated with the set side thereof is connected to an input of the logical OR circuit 104 and to the reset terminal of the high compare latch 102. Hence, when the low compare latch 103 is set, it will reset the equal compare latch 100 and the high compare latch 102. It is seen that the equal compare latch does not reset either the high compare latch 102 or the low compare latch 103.

When comparing two quantities of data serially by bit and serially by character, the comparison continues until an inequality is detected between characters; an inequality between data bits within a character does not stop the comparing operation. Hence, after all of the bit positions for a pair of characters have been examined, the state of the equal compare latch 100 will be examined to determine whether or not the data comparing operation shall continue. This is accomplished by means of logical AND circuit 110 which has an input connected to the output of the equal compare latch 100 associated with the reset side thereof, an input connected to the output of the fourth position of the sync ring 40, and an input connected to the output of the tenth position of the bit ring 50. By this arrangement, if the equal compare latch is off at sync 4 time of bit 10 time, then logical AND circuit 110 will function to pass an electrical impulse. The output of logical AND circuit 110 is connected to the set terminal of the stop compare latch 96. Hence, if the logical AND circuit 110 passes an electrical signal, it will set the stop compare latch. With the stop compare latch 96 set, logical AND circuits 84 and 93 will not be conditioned to pass an electrical impulse. Hence, the data comparing operation ends. Under these conditions, either the high compare latch 102 or the low compare latch 103 would be on or set to give the answer of the comparing operation. The stop compare latch 96 is then reset before beginning a subsequent comparing operation by any suitable means such as by a timed electrical signal which starts each comparing operation.

The data comparing operations proceed starting at the high order of field or at the leftmost position of a field and progressing to the right, starting with the E bit for each position and progressing toward the G1 bit. When two characters are being compared, the identical bit positions for these characters are looked at simultaneously, and the bit position containing a bit is arbitrarily stated to be low compared to the position which does not contain a bit. The code chosen is such that the last unequal comparison defines the relative magnitude of the characters being compared.

Referring to FIG. 2, the collating sequence by character is from low order to high order starting with the character termed "blank" and proceeding toward the numeric "9." Comparing within any character proceeds from high order to low order starting with the E bit and proceeding toward the G1 bit. According to these rules then, a "6" should be higher than a "5." To find out whether this is true, refer to FIG. 2. It is seen that, for the E bit position, there are no bits for either a "5" or a "6"; hence, the comparison would be equal. The absence of an E bit in both the register 82 and the register 92 would effect a positive impulse on the outputs of inverters 85 and 94, respectively, thereby conditioning logical AND circuit 95 which would then pass an electrical impulse via logical OR circuit 101 to set the equal compare latch 100. Progressing to the D bit position, it is seen that there is a bit for the character "6" but not for the character "5." Hence, at this point in the data comparing operation, the character "6" compares low with respect to the character "5." However, upon advancing to the C bit position, it is seen that the character "5" contains a bit while the character "6" does not. Hence, the character "5" now compares low with respect to the character "6." Advancing to the B bit position, it is seen that both character "5" and character "6" contain a bit and, therefore, they compare equal. However, this equal condition does not change the previous answer; i.e., the character "5" was low with respect to character "6." Since the remaining bit positions for both the characters "5" and "6" do not contain the bits, these positions will compare equal and, accordingly, the last unequal condition will prevail; that is, the character "5" compares low with respect to character "6."

With reference to FIG. 4, the latches 100, 102 and 103 store the answers obtained during a data comparing operation. It is seen that these latches are interconnected so that a high answer will override an earlier low answer and vice versa. However, the equal answer latch 100 does not have the facility of overriding the high or low answer latches 102 and 103, respectively. Hence, the last unequal comparison, whether it be high or low for any particular character, will determine the answer of particular sequence of comparisons for that particular character. Of course, the equal answer latch 100 will be in the set state at the end of a comparing operation only if all of the bits for every bit position compared equal.

Assume that the following two numbers are being compared:

$$\frac{98675}{98595}$$

The position ring 60 essentially starts the comparison operation beginning with the leftmost column of the numbers and causing the comparison to proceed to the right. The bit ring 50 causes the comparison to proceed bit position by bit position with the bit positions being interrogated during every sync 2 time of a bit position under control of the sync ring 40. With the foregoing as background information, it is seen that for the first column positions of the numbers being compared for the example given, the equal latch 100 will be set to show an equal comparison. The comparing operation then continues automatically to the next column without altering the answer latches. At the end of the comparing operation for the second character position, the equal latch 100 will remain on to indicate that the characters compared equal for that particular character position. The comparison operation continues for the third character position or column. At the end of the comparison operation for the third column, the answer latches will indicate that the first number is high compared with the second number and the equal answer latch 100 will have been reset or turned off. With the equal answer latch 100 off, the stop compare latch 96 will be set at sync 4 time of bit 10 time. With the stop compare latch 96 on, the logical AND circuits 84 and 93 will not be able to perform a comparing operation because they will not be conditioned to pass an electrical impulse. Additionally, the equal compare latch 100 will be held in the reset state because either the high compare latch 102 or the low compare latch 103 will be on.

With reference to FIG. 4, it is seen if both registers 82 and 92 contain a bit of information, logical AND circuit 83 will be conditioned to pass an electrical impulse via logical OR circuit 101 to set the equal compare latch 100. Logical AND circuits 84 and 93 and 95 will not be conditioned to pass an electrical impulse because of the inverters 85 and 94. If the register 82 and the register 92 both do not contain a bit of information, then, because of inverters 85 and 94, logical AND circuit 95 is conditioned to pass an electrical impulse to set the equal compare latch 100. Under these conditions, logical AND circuits 83, 84 and 93 will not be conditioned to pass an electrical impulse. When the register 82 contains a bit of information and the register 92 does not, then logical AND circuit 84 is conditioned to pass an electrical impulse; and the high compare latch 102 is set. The setting of the high compare latch 102, of course, resets the equal compare latch 100 via logical OR circuit 104 and resets the low compare latch 103 directly. If the register 92 contains a bit of information while the register 82 does not, then the logical AND circuit 93 is conditioned to pass an electrical impulse to set the low compare latch 103. The setting of the low compare latch 103 also resets the equal compare latch 100 via the logical OR circuit 104 and resets the high compare latch 102 directly.

FIG. 5 shows an alternate embodiment of the circuitry for controlling the equal compare latch 100. As it will be seen shortly, this is a preferred embodiment because it entails less electrical components. In FIG. 5, like elements, as those shown in FIG. 4, have retained like reference characters. Generally speaking, logical AND circuits 83 and 95, shown in FIG. 4, have been eliminated in FIG. 5 as well as logical OR circuit 101. The set terminal of the equal compare latch 100 is directly connected to the output of the third position of the sync ring 40. By this arrangement, the equal compare latch 100 will be set every sync 3 impulse; and this is without regard to the status of data in the registers 82 and 92. However, the equal compare latch 100 will not remain set if, in fact, data is not simultaneously present or absent in registers 82 and 92. Under this latter condition, either the high compare latch 102 or the low compare latch 103 will be set depending upon which register does not contain the data, and the equal latch 100 will be reset by either the high compare latch 102 or the low compare latch 103. It may thus be concluded that, in this arrangement, it is unnecessary for the equal compare latch to be set according to the status of the registers 82 and 92. Rather, the equal compare latch 100 is set cyclically and remains set if either the high compare latch 102 or the low compare latch 103 has not been set; and is reset if either has been set.

From the foregoing, it is seen that the invention provides apparatus for sequentially examining pairs of bits of data forming characters to determine whether or not the characters being examined on a bit-by-bit basis are equal and, if not equal, which character is considered to be high according to a particular predetermined collating sequence assigned to the characters. Further, it is seen that, if the results of the comparison indicate that the characters are not equal, the comparison operation stops and an indication is provided as to the relative weights of the characters. Further, it is seen that the apparatus for sequentially examining the bits of data forming the data characters is of relatively low cost.

While the invention has been particularly shown and described with reference to a preferred embodiment thereof, it will be understood by those skilled in the art that various changes in form and details may be made therein without departing from the spirit and scope of the invention.

What is claimed is:

1. In data processing apparatus, data storage means having at least two data storage areas for storing data characters represented by bits of data;

a pair of single bit registers connected to said data storage means so as to be able to receive data simultaneously from said two data storage areas;

means for transferring data serially by bit from said two data storage areas to said single bit registers;

a first indicator settable to indicate whether the data contents of said registers are equal according to a predetermined collatable code;

a second indicator settable to indicate whether the data contents of one register are high compared to that of the other register;

a third indicator settable to indicate wehether the data contents of said one register are low compared to that of said other register;

first control means for controlling the setting of said first indicator, said first control means being operably connected to said registers and said first indicator so as to effect the setting of said first indicator if there are data bits present and absent in both of said registers at the same time;

second control means for controlling the setting of said second indicator, said second control means being operably connected to said registers and said second indicator so as to effect the setting of said second indicator if said one register is devoid of a data bit while said other register contains a data bit; and third control means for controlling the setting of said third indicator, said third control means being operably connected to said registers and said third indicator so as to effect the setting of said third indicator if said one register contains a data bit while said other register is devoid of a data bit.

2. In data processing apparatus as in claim 1 further comprising:

settable control means operably connected to said first indicator to be set thereby at a predetermined time if said first indicator is in the non-set state at that time and connected to said second and third control means so as to prevent the operation thereof if said settable control means is set by said first indicator at said predetermined time.

3. In data processing apparatus as in claim 1 further comprising:

first circuit means connected to reset said first indicator upon said second or third indicator being set, second circuit means connected to reset said second indicator upon said third indicator being set, and third circuit means connected to reset said third indicator upon said second indicator being set whereby the second and third indicators are able to reset said first indicator and reset each other while said first indicator is unable to reset said second and third indicators.

4. In data processing apparatus as in claim 2 wherein said predetermined time is when all bit positions for forming any character have been read out from data storage to said registers.

5. In data processing apparatus for serially examining pairs of bit positions forming characters to determine if the characters are equal and, if unequal, which character is considered to be high according to a predetermined collatable code assigned to the characters;

a first settable indicator for indicating that the bits forming two characters being examined are equal;

a second settable indicator for indicating that the bits forming one character compare high to the bits forming the other character being examined;

a third settable indicator for indicating that the bits forming said one character compare low to the bits forming said other character;

means responsive to the bits forming said characters for setting said first indicator;

means responsive to the bits forming said one character and the corresponding absence of bits forming said other character for setting said second indicator;

means responsive to the bits forming said other character and the corresponding absence of bits forming said one character for setting said third indicator;

first means operably connected to reset said first and third settable indicators upon said second indicator being set; and second means operably connected to reset said first and second settable indicators upon said third indicator being set.

6. In data processing apparatus as in claim 5 further comprising:

means for sampling the state of said first indicator after all the bits forming said characters have been examined and prevent the further setting of said second and third indicators if said first indicator is in the non-set state at this time.

7. In data processing apparatus for serially examining pairs of bit positions for containing in coded form bits of data forming characters to determine the simultaneous presence and absence of bits in said bit positions whereby, upon examination of all bit positions, an indication will be had as to whether the characters are of equal weight and, if unequal, which character compares high relative to the other according to a predetermined collatable code, a first indicator settable upon simultaneous presence and absence of bits in the pair of bit positions being examined for every pair of bit positions being examined to provide an indication that bit positions are of equal weight, a second indicator settable upon the simultaneous presence of a bit in one of the bit positions and the absence of a bit in the other of the bit positions in the pair of bit positions being examined for every pair of bit positions being examined to provide an indication that said one bit position containing a bit compares high relative to said other bit position being devoid of a bit, a third indicator settable upon the simultaneous presence of a bit in said other bit position and the absence of a bit in said one bit position to provide an indication that said one bit position compares low relative to said other bit position, first means responsive to the simultaneous presence and absence of bits for setting said first indicator, second means responsive to the simultaneous presence of a bit in said one bit position and the absence of a bit in said other bit position for setting said second indicator, third means responsive to the simultaneous presence of a bit in said other bit position and the absence of a bit in said one bit position for setting said indicator, first circuit means connected under control of said second indicator upon the same being set to reset said first and third indicators, second circuit means connected under control of said third indicator upon the same being set to reset said first and second indicators, and settable control means connected to said first indicator to be set thereby if said first indicator is in the non-set state after all bit positions have been examined, said settable control means being connected to said second and third means to prevent the operation thereof, thereby preventing further setting of said second and third indicators upon said control means being set.

8. In data processing apparatus for serially examining pairs of bit positions forming data characters to determine if the characters are equal and, if unequal, which character is considered to be high according to a predetermined collatable code assigned to the characters, a first settable indicator for indicating that the bits forming two characters being examined are equal;

means for cyclically setting said first settable indicator for every bit position of said characters without regard to the presence or absence of bits in the bit positions being examined;

a second settable indicator for indicating that the bits forming one character compare high to the bits forming the other character being examined;

a third settable indicator for indicating that the bits forming said one character compare low to the bits forming said other character;

means responsive to a bit in a bit position of said one character and the corresponding absence of a bit in a corresponding bit position of said other character for setting said second settable indicator for each corresponding pairs of bits positions examined;

means responsive to the setting of said second settable indicator for resetting said first and third settable indicators;

means responsive to a bit in a bit position of said other character and the corresponding absence of a bit in a corresponding bit position of said other character for setting said third settable indicator for each corresponding pairs of bit positions examined; and means responsive to the setting of said third settable indicator for resetting said first and second settable indicators whereby only one of said settable indicators is in the set position after all the bit positions of a character have been examined.

References Cited by the Examiner

UNITED STATES PATENTS

| | | | |
|---|---|---|---|
| 2,900,620 | 8/59 | Johnson | 235—177 XR |
| 3,024,981 | 3/62 | Allen | 235—177 XR |

MALCOLM A. MORRISON, *Primary Examiner.*

D. W. COOK, *Examiner.*